Jan. 13, 1970   W. HOLZER   3,488,881
KIT WITH COMPONENTS MADE OF SEVERABLY JOINED IDENTICAL UNITS
Filed Dec. 6, 1965   2 Sheets-Sheet 1

INVENTOR:
WALTER HOLZER
By Woodhams, Blanchard and Flynn
Attorneys

Jan. 13, 1970      W. HOLZER      3,488,881

KIT WITH COMPONENTS MADE OF SEVERABLY JOINED IDENTICAL UNITS

Filed Dec. 6, 1965      2 Sheets-Sheet 2

INVENTOR:
WALTER HOLZER
By
Woodhams, Blanchard and Flynn
Attorneys

United States Patent Office

3,488,881
Patented Jan. 13, 1970

3,488,881
KIT WITH COMPONENTS MADE OF SEVERABLY
JOINED IDENTICAL UNITS
Walter Holzer, Schutzenrain, Meersburg
(Bodensee), Germany
Filed Dec. 6, 1965, Ser. No. 511,619
Claims priority, application Germany, Dec. 15, 1964,
H 54,586
Int. Cl. A63h 33/08, 33/04, 33/10
U.S. Cl. 46—25                                   7 Claims

ABSTRACT OF THE DISCLOSURE

A building kit for building models and for play purposes comprising an elongated hollow plastic component having a plurality of identically shaped and severable units connected together at adjacent surfaces.

---

Figure 1:
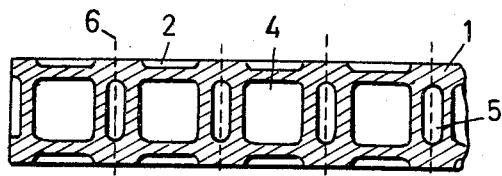

The present invention concerns a building kit for modelling and play purposes, comprising hollow plastic building components which can be positively fitted onto one another by means of projections and depressions, with units dimensioned in accordance with a module system.*

The phrase "module system" is to mean a square grid related to a basic measurement, for example, 0.25 meter, which in particular cases is used for construction planning in horizontal plan, vertical plan and section. The module system is used particularly in models of assembled buildings where the components used are dimensioned according to a basic measurement such as half or double the basic measurement.

The aim of the invention is to provide an improved plastic building kit offering a wider field of application.

It is known to provide plastic building kits in which the building components are hollow and equipped with projections and depressions which can be fitted together to form a positive connection. One disadvantage of these known kits is that they always require a number of different components. The dimensions of these components are multiples of a basic unit. The components are designed so that a number of basic units can be replaced by a larger component with appropriate dimensions. Thus a considerable multiplicity of types is necessary in order to obtain a building kit capable of many variations.

Added to this is the fact that in all known plastic building kits only finished bricks are provided. In cases where such kits are used as toys this is a disadvantage since building with such bricks is purely a matter of assembly. The work of shaping the material, which is inherently essential to building technique, is omitted altogether. Thus limits are set to the play activity which are by no means the fault of the material.

Unless magnetic parts are incorporated, only plug type connections can be used in the known plastic building kits. For many purposes, however, it is desirable to make the fastening more permanent and/or more stable.

The problem of the invention is therefore to create a plastic building kit in which the components can be easily manipulated by the user to give the required dimensions and/or the fastening means to continue building, but nevertheless having the capabilities of known plastic building kits.

The problem has been solved, according to the invention, by a building kit for modelling and play purposes,

---

*The phrase "module system" is to mean a square grid related to a basic measurement, for example, 0.25 meter, which in particular cases is used for construction planning in horizontal plan, vertical plan and section. The module system is used particularly in models of assembled buildings where the components used are dimensioned according to a basic measurement such as half or double the basic measurement.

--- comprising hollow plastic building components which can be positively fitted onto another with the aid of projections and depressions, with units dimenshioned in accordance with a module system, wherein a prefabricated variable basic component is formed from a plurality of basic units and has reductions in cross section in accordance with the module system for providing division surfaces between the units.

Thus, the starting point is a standard element comprising a given number of basic units. Smaller numbers of units or even individual units by themselves can be cut off from the standard element as desired. The horizontal plan of a single unit should desirably be a regular polygon such as a hexagon, square or rhombus. The shape of the basic component made up of such basic units can be varied as desired, although for manufacturing reasons, a shape having few straight edges is preferable.

It is essential that the basic units severed from the basic component should have identical lateral surfaces, so that the contours of the division surface are repeated on the side surfaces of the basic component. Severing will then always produce components or units of identical appearance at the side surfaces, whether the components cut off consist of single units or several units.

It is desirable for the lateral surfaces to contain indentations which, like the sectional surfaces, extend only over part of the height of the basic component. This makes it possible to create special profiles, which may give increased strength both to the basic component and to the individual unit and which may also permit decorative designs, for example, shaping the external surface of a brick wall.

According to a further feature of the invention all the slots in the basic component open towards one side, making the manufacture thereof particularly simple. The basic components may be made by injection moulding in a single operation.

It is a great advantage for the projections and/or depressions to contain holes to enable a shaft to be inserted and/or the plug connection to be secured by screws, rivets or the like, the holes being closed, for example, by a thin moulded skin.

Because of this substantial increase in the usefulness of the bricks very stable buildings can be constructed since there is now an additional fastening method. Parts which cannot be held satisfactorily with just a plug connection, such as jutting out beams and the like, can be secured by an additional screw fastening. The component may itself be used as a bearing for shafts, bars and the like. The moulded skin not only represents a great simplification in the manufacturing process but again has the advantage of occupying the user in finishing the component. Moreover finished buildings have a more pleasing appearance if all the components are not perforated at the place provided for the purpose.

In a further more specific embodiment of the invention the slots are designed so that the bricks can be arranged slot to slot by using connecting members which are receivable in the slots; this results in simple and reliable shaft bearings or end surfaces for constructions which are supported on a lateral surface of the components. If the indentations provided at the division surfaces to reduce the cross section are made in the form of continuous or subdivided, this will produce advantages in the moulding process since there will be little wastage and no finishing work. Smooth slots have the further advantage of enabling simply shaped connecting members to be used for joining the bricks slot to slot. Where the slots are sub-divided, shafts are formed into which single pins can be inserted. The shafts may, of course, also have a circular cross section. If the slots have undercuts, for example of dovetail shape, the components may be joined together by simple wedges. Thus the side surfaces may also be used for connecting purposes and for accessories such as inscriptions, signs and the like. Transverse connections between the components and also an offset arrangement may be obtained if the various connecting members are offset from one another.

Further, according to the invention, shaft bearings are provided in the form of parts open at one side for fastening to the slot. These parts may again be multiples from which suitable lengths are cut off. With such parts shafts may be mounted transversely to the projections or depressions without any novel basic components being required for the purpose. In shaping these bearings which are open at one side it may be favourable to provide stops so that the shaft extending through it is freely movable in its bearing even if strong forces were to be exerted on the basic component from above. The shaft bearings may be adapted to be plugged in or screwed on, i.e. provided with securing means particularly suitable for a high axle load. Fastening by screws may be an advantage if a shaft has to be pressed firmly against the component in its bearing and thereby made into a stationary spindle.

According to another feature of the invention, the components are moulded members, for example in the form of plates, strips or T- or corner pieces, from which any desired number of units can be separated and which can, if appropriate, be attached at an angle to one another. In such a case, a screw fastening will be particularly advantageous. It is also possible to provide components with a different division of the module system, in a predetermined fixed ratio, e.g. of 1:2, to the basic division. Given suitable shaping of the projections and depressions, the components having the coarser division may in this example be fitted obliquely at 45° onto the parts with the finer module system. Transitional members to connect components attached at an angle give a neater shape to grooves and corners but may also be used as supporting elements.

Suitable door and window parts forming a basic component may be made up of a plurality of units from which suitable lengths or numbers of units may be severed as required.

Basic roof and gable components unified with roof and gable members which can be cut to size may be produced to fill in the ends of houses and buildings.

Wheels may be provided, the hubs of which may contain holes closed by skins. For many purposes, it will be an advantage if the holes have the same internal diameter as the holes in the components. Any shaft or bar inserted therethrough will then be freely movable in the hubs. However the wheel may be press fitted onto a spindle if, when piercing the moulded, the diameter of the hole is made slightly less than the diameter of the spindle. If the hubs of the wheels can be fitted onto the raised portions of the components, then the wheel itself can be used as a component. Naturally it is possible to provide a slot designed to be fitted onto a projection on one side of the hub and for the other side to carry a corresponding projection. Covering caps which can be fixed to the wheels may be provided to prevent the wheel from moving laterally in relation to the axle. If the caps are made to plug in and/or screw on, a good replica can be obtained of the wheels on motor vehicles.

For the building kit according to the invention, it is essential to provide an apparatus into which apparatus the components are laid for cutting off the basic units and for punching out the moulded skins. The necessary alterations are then made with a severing or punching tool. If the apparatus is adjusted to the external shape of the basic component then the components will come to rest in the correct position by themselves. The apparatus, may, for example, be designed like a cutting cradle, the cutting station being arranged where a dividing surface is provided for by the module system division.

Figure 2:
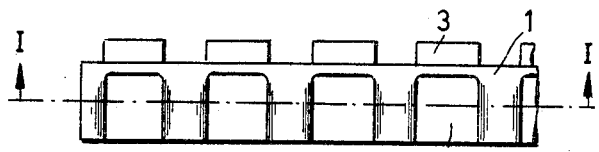
Figure 3:
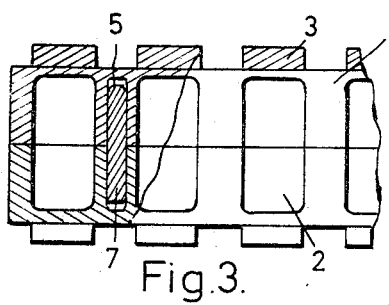
Figure 4:
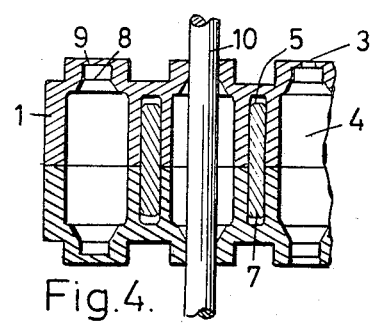
Figure 5:
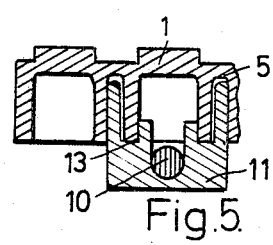
Figure 6:
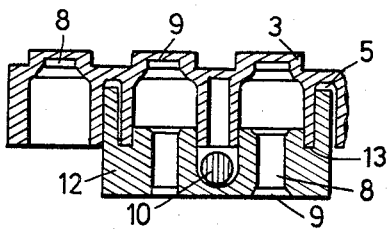
Figure 7:
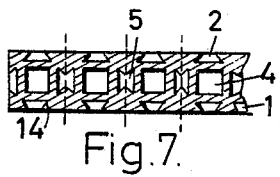
Figure 8:
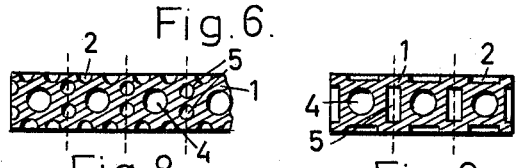
Figure 9:
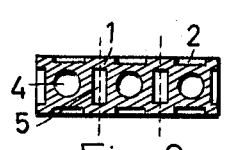
Figure 10:
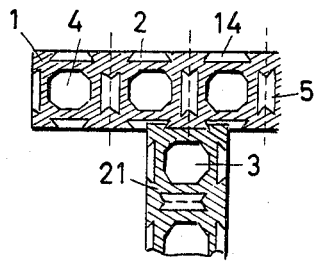
Figure 11:
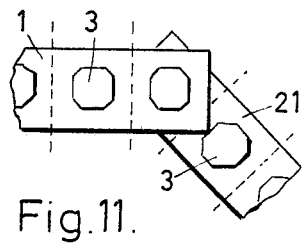
Figure 12:
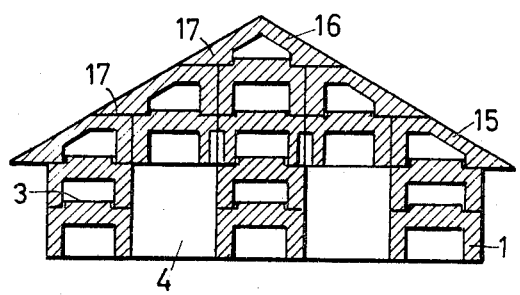
Figure 13:
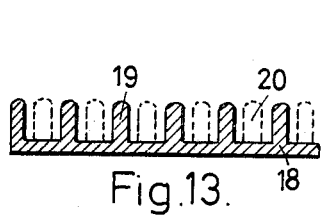
Figure 14:
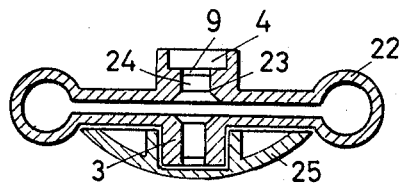
Figure 15:
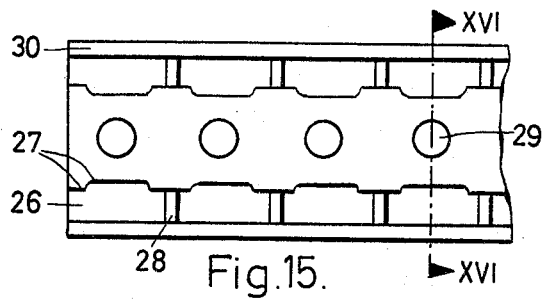
Figure 16:
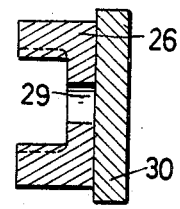

Examples of the invention will now be explained by reference to the drawing which, together with the description relating thereto, contains further features of the invention. In the drawings:

FIG. 1 is a longitudinal section through a basic building component according to the invention, along the line I—I in FIG. 2, FIG. 2 is a side elevation of a basic building component, FIG. 3 is a side elevation of two such components fitted together slot to slot, FIG. 4 is a side view of two basic building components, fitted together slot to slot and containing a spindle, the other holes being closed by moulded skins, FIG. 5 is a basic component with a shaft bearing fitted onto it, FIG. 6 shows a basic component with a shaft bearing whic can be plugged in and screwed on, FIG. 7 is a longitudinal section through a basic component with undercut portions, FIG. 8 is a longitudinal section through a basic component with sub-divided indentations, FIG. 9 is a longitudinal section through a basic component with continuous indentations, FIG. 10 is a longitudinal section through externally joined basic components with undercut portions, FIG. 11 is a plan view of obliquely joined components, FIG. 12 is a section through a building with a roof, FIG. 13 is a section through a connecting member which can be plugged into a plurality of slots, FIG. 14 is a section through a wheel having a hub which can be plugged in and a hub cap, FIG. 15 is a plan view of an apparatus for severing and punching building components or units, and FIG. 16 is a section through an apparatus taken along the line XVI—XVI in FIG. 15.

A basic building component 1 according to the invention is illustrated in FIGS. 1 and 2 and comprises a plurality of individual units interconnected by integral severable connecting means on adjacent side surfaces thereof. The component has indentation 2 in the side surfaces, projections 3 from the top and recesses 4 in the bottom. Slots 5 are arranged between the recesses 4 so that if the basic component is severed along the slotted lines 6 new components or individual units are formed and the surfaces at the division have the same contour as the side surfaces. The raised portions 3 are shaped so that they can be fitted into the recesses 4 of an adjacent component with a positive connection.

As shown by FIGS. 3 to 9, the slots 5 may have different shapes and different functions. It will be seen from FIGS. 3 and 4 that connecting members 7 can each join two basic components 1 slot to slot. Two components 1 thus joined can form a bearing for a shaft 10, the shaft being received in holes 8 following the piercing of the moulded skins 9. As shown in FIG. 5, a shaft bearing 11 which is open at one side may also be placed in the slots 5, the bearing being provided with stops 13 to leave clearance for an inserted shaft 10 between the shaft 10 and the lower edge of the outer surface of the component 1. In FIG. 6 a plug-in and screw-on shaft bearing 13 is fitted into the slots 5 in a basic component 1 where the holes 8 are closed by the moulded skins 9. The holes 8 may receive either fastening screws or shafts. But the bearing 12 (FIGURE 6) is used primarily for heavy duty shafts 10 which are inserted transversely.

FIG. 7 shows a basic component 1 where the indentations 2 are provided with undercuts 14. In such components the side walls can also be used for fastening purposes. An example of this is shown in FIG. 10, where the end wall of a second basic component 21 is fitted into the side wall of the component 1. The indentations 2 in both basic components 1 and 21 must either be continuous like the FIG. 9 embodiment or they must extend over half the overall height, in which case one of the components will be fitted with the slot upwards. A further possible construction for the slots 5 is shown in FIG. 8. It will be seen from this that the slots 5 are sub-divided by intermediate webs so as to form separate holes, in this example circular ones. The indentations 2 are likewise semicircular in section. Suitable connecting members 7 would in this case take the form of pins. A particularly simple form for the indentations 2 and slots 5 is shown in the basic component 1 in FIG. 9. As both the slots 5 and the indentations 2 are continuous the supporting sections are here greatly reduced, thus providing a like component suitable for smaller loads.

FIG. 11 shows how a basic component 1 can be fitted at an angle onto a second basic component 21. In the example illustrated, the projections 3 are octagonal, giving an angle of 45°. Different angles can be produced by giving the projections 3 other suitable shapes, and if the projections 3 are circular, any angle is possible. It is an advantage for a plug-in connection of this type to be secured by screws.

The construction of the roof bricks will be apparent from FIG. 12. On a sub-structure made up of basic components 1, roof bricks 15 and gable bricks 16 are placed, having projections 17 and recesses which fit onto the projections 3 of the basic components.

FIG. 13 shows a connecting member 18 adapted to fit into a plurality of slots and provided with projections 19 which are fitted into the slots 5. Such connecting members 18 may also have several rows of projections 19, either arranged parallel with one another or—as indicated by the broken-line projections 20—offset a certain distance from the first row.

The wheel 22 shown in FIG. 14 has a hub 23 containing a hole 24. It can itself be used as a component since it has a projection 3 on one side and a depression 4 on the other. The hole 24 is closed by moulded skins 9.

A hub cap 25 is fitted onto the projection 3, although such caps may also be designed to fit into the recess 4. It is also possible to provide threaded holes extending through the wheel discs.

FIGS. 15 and 16 show an apparatus for finishing the components. The apparatus 26 has a profile 27 to match the external surface of the basic components. Cutting lines 28 are provided at the possible severing points, with punching holes 29 arranged between them. The apparatus 26 rests on a base 30.

Among the applications of the invention are all plastic building kits where a basic component is provided, made up of periodically repeated units which can be severed from one another in any desired number.

What I claim is:

1. In a building kit for building models and for play purposes, the combination comprising:
   an elongated, hollow, plastic component having a plurality of identically shaped units interconnected by integral severable connecting means at adjacent side surfaces, each of said units having a projection on a first surface and a recess on a second surface for receiving a projection, each of said units having indentations of equal size in all of the side surfaces thereof, said side surfaces being separate from said first and second surfaces, said indentations being open along at least one edge thereof;
   a slot defined by a pair of said indentations on said adjacent side surfaces of at least a pair of said units, said slot being closed at one end and opening outwardly at said one edge.

2. The building kit as defined in claim 1, including a connecting member which is receivable in at least a pair of said slots in at least two of said components whereby a pair of said components can be joined together slot-to-slot.

3. The building kit as defined in claim 1, wherein said units are severable from said component and said slot is, upon severance, split to define one of said pairs of indentations on one side of said severed unit.

4. The building kit as defined in claim 1, including a bearing for an elongated rod, said bearing being securable to said component in at least two of said slots whereby said elongated rod can be utilized as a support for further building elements.

5. The building kit as defined in claim 4, including a wheel securable to said elongated rod.

6. The building kit as defined in claim 1, wherein said projections on said units are hollow and define a portion of said recess.

7. The building kit as defined in claim 6, wherein the bottom of said recess is closed by a thin skin capable of being pierced.

References Cited

UNITED STATES PATENTS

| 2,442,122 | 5/1948 | Erhardt | 46—25 |
| 2,844,910 | 7/1958 | Korchak | 46—28 |
| 3,007,279 | 11/1961 | Korchak | 46—28 |
| 3,034,254 | 5/1962 | Christiansen | 46—25 |
| 3,148,477 | 9/1964 | Bjorn et al. | 46—25 X |

FOREIGN PATENTS

| 229,861 | 8/1960 | Australia. |
| 1,210,151 | 9/1959 | France. |
| 846,151 | 8/1960 | Great Britain. |

F. BARRY SHAY, Primary Examiner

U.S. Cl. X.R.

46—23, 26